United States Patent
Rajasekharan et al.

(10) Patent No.: US 9,449,630 B2
(45) Date of Patent: Sep. 20, 2016

(54) SLIDERS HAVING AT LEAST TWO REGIONS ON THE TRAILING EDGE SURFACE

(71) Applicant: SEAGATE TECHNOLOGY LLC, Cupertino, CA (US)

(72) Inventors: Ajaykumar Rajasekharan, Bloomington, MN (US); Gary J. Kunkel, Minneapolis, MN (US); David J. Ellison, Minneapolis, MN (US); Narayanan Ramakrishnan, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/728,291

(22) Filed: Jun. 2, 2015

(65) Prior Publication Data

US 2016/0019924 A1 Jan. 21, 2016

Related U.S. Application Data (60) Provisional application No. 62/006,415, filed on Jun. 2, 2014.

(51) Int. Cl.
*G11B 5/60* (2006.01)

(52) U.S. Cl.
CPC .................. *G11B 5/6082* (2013.01)

(58) Field of Classification Search
CPC ..... G11B 5/6005; G11B 5/40; G11B 5/3106; G11B 33/1446
USPC ................. 360/235.1, 235.7, 236.5
See application file for complete search history.

(56) References Cited

U.S. PATENT DOCUMENTS

| | | |
|---|---|---|
| 5,200,868 A | 4/1993 | Chapin |
| 5,386,400 A | 1/1995 | Nakayama |
| 5,661,618 A * | 8/1997 | Brown ................ G11B 5/6005 360/234.1 |
| 5,751,517 A | 5/1998 | Agarwal |
| 5,768,056 A | 6/1998 | Boutaghou |
| 6,055,127 A | 4/2000 | Boutaghou |
| 6,188,547 B1 | 2/2001 | Gui |
| 6,233,118 B1 | 5/2001 | Boutaghou |
| 6,421,202 B1 | 7/2002 | Tanaka |

(Continued)

FOREIGN PATENT DOCUMENTS

| | | | | |
|---|---|---|---|---|
| CN | 101800064 A * | 8/2010 | ............... | G11B 5/40 |
| EP | 1898398 A1 * | 3/2008 | ........... | G11B 5/3169 |

(Continued)

OTHER PUBLICATIONS

Ambekar, R.P. et al., "Lubricant Depletion and Disk-to-Head Lubricant Transfer at the Head-Disk Interface in Hard Disk Drives", *Journal of Tribology*, 131; 2009, pp. 03901-1-03901-8.

(Continued)

*Primary Examiner* — Will J Klimowicz
(74) *Attorney, Agent, or Firm* — Mueting, Raasch & Gebhardt, P.A.

(57) ABSTRACT

A slider that includes a leading edge surface; a trailing edge surface; and an air bearing surface (ABS) positioned between the leading edge surface and the trailing edge surface, wherein the trailing edge surface includes a read-write element, at least one low surface energy region and at least one high surface energy region.

20 Claims, 7 Drawing Sheets

(56) References Cited

U.S. PATENT DOCUMENTS

| | | | |
|---|---|---|---|
| 6,424,493 B1 * | 7/2002 | Matsumoto | G11B 5/6005 360/235.3 |
| 6,445,543 B1 | 9/2002 | Gui | |
| 6,477,011 B1 * | 11/2002 | Hsiao | G11B 5/6005 360/235.1 |
| 6,504,682 B1 | 1/2003 | Sannino | |
| 6,594,113 B2 | 7/2003 | Rao | |
| 6,747,847 B2 * | 6/2004 | Stoebe | G11B 5/6005 360/235.7 |
| 7,054,108 B2 | 5/2006 | Boutaghou | |
| 7,227,723 B2 | 6/2007 | Nath | |
| 7,333,297 B2 | 2/2008 | Park | |
| 7,502,202 B2 | 3/2009 | Takahashi | |
| 7,855,854 B2 | 12/2010 | Hu | |
| 7,961,433 B2 * | 6/2011 | Zheng | G11B 5/6005 360/236.5 |
| 8,164,859 B2 * | 4/2012 | Imamura | G11B 5/10 360/235.1 |
| 8,169,744 B2 | 5/2012 | Dorius | |
| 8,174,794 B2 | 5/2012 | Dorius | |
| 8,199,435 B2 * | 6/2012 | Fong | G11B 5/6005 360/234.4 |
| 8,203,805 B2 * | 6/2012 | Huang | G11B 5/6005 360/235.4 |
| 8,520,339 B2 | 8/2013 | Sonda | |
| 8,593,763 B2 * | 11/2013 | Scheppers | G11B 5/6005 360/235.7 |
| 8,810,968 B2 | 8/2014 | Rajasekharan | |
| 2002/0001157 A1 | 1/2002 | Kang | |
| 2003/0058578 A1 | 3/2003 | Boutaghou | |
| 2005/0207065 A1 | 9/2005 | Takagi | |
| 2008/0123220 A1 | 5/2008 | Kajitani | |
| 2008/0158716 A1 | 7/2008 | Kubotera | |
| 2009/0059432 A1 * | 3/2009 | Kubotera | G11B 5/6005 360/236.6 |
| 2009/0219651 A1 | 9/2009 | Zheng | |
| 2010/0002339 A1 * | 1/2010 | Imamura | G11B 5/6005 360/234.3 |
| 2010/0103560 A1 * | 4/2010 | Imamura | G11B 5/6005 360/234.3 |
| 2010/0149693 A1 * | 6/2010 | Ooeda | G11B 5/6005 360/246.2 |
| 2010/0202085 A1 * | 8/2010 | Ishii | G11B 5/6005 360/110 |
| 2011/0237765 A1 * | 9/2011 | Iyer | B05D 1/185 526/209 |
| 2012/0229933 A1 * | 9/2012 | Ma | G11B 5/6082 360/234.1 |
| 2015/0103444 A1 * | 4/2015 | Kunkel | G11B 5/41 360/235.3 |
| 2015/0179200 A1 * | 6/2015 | Ramakrishnan | G11B 5/6082 360/234.1 |

FOREIGN PATENT DOCUMENTS

| | | | | |
|---|---|---|---|---|
| GB | 2351839 A | * | 1/2001 | G11B 5/10 |
| JP | 56169264 A | * | 12/1981 | |
| JP | 63064684 A | * | 3/1988 | |
| JP | 10334436 A | * | 12/1998 | |
| JP | 2004265541 A | * | 9/2004 | |
| JP | 2008065903 A | * | 3/2008 | |
| JP | 2009301624 A | * | 12/2009 | |
| JP | 2010146613 A | * | 7/2010 | |
| KR | 20030012535 A | * | 2/2003 | |
| KR | 100441418 B1 | * | 7/2004 | |
| WO | WO 9408334 A1 | * | 4/1994 | G11B 5/255 |
| WO | WO 9722119 A1 | * | 6/1997 | G11B 5/6005 |

OTHER PUBLICATIONS

Dai, Q., et al., "Modeling the Washboard Effect at the Head/Disk Interface", Journal of Applied Physics, 96(1);2004, pp. 696-703.

Goto, Jing, "Head Disk Interface Technologies for High Recording Density and Reliability", Fugitsu Sci. Tech. J., 42(1); 2006, pp. 113-121.

Gui, Jing, "Tribology Challenges for Head-Disk Interface Toward 1 Tb/in$^2$", IEEE Transaction on Magnetics, 39(2); 2003, pp. 716-721.

Katta, R.R. et al., "Experimental and FEA Scratch of Magnetic Storage Thin-Film Disks to Correlate Magnetic Signal Degradation with Permanent Deformation", Journal of Tribology, 132; 2010, pp. 021902-1-021902-11.

Kubotera, H. et al., "Lubricant Migration Simulations on the Flying Head Slider Air-Bearing Surface in a Hard Disk Drive," IEEE Transaction on Magnetics, 43(9); 2007, pp. 3710-3715.

Marchon, B. et al., "A Model for Lubricant Flow from Disk to Slider", IEEE Transaction on Magnetics, 39(5); 2003, pp. 2447-2449.

Marchon, B., et al. "The Physics of Disk Lubricant in the Continuun Picture", IEEE Transaction on Magnetics, 41(2); 2005, pp. 616-620.

Pit, R. et al., "Formation of Lubricant "Moguls" at the Head/Disk Interface", Tribology Letters, 10(3); 2001, pp. 133-142.

Yoon, S.J. et al., "Design Sensitivity Analysis of Air-Lubricated Slider Bearings", IEEE Transaction of Magnetics, 38(5); 200,; pp. 2171-2173. .

\* cited by examiner

SLIDERS HAVING AT LEAST TWO REGIONS ON THE TRAILING EDGE SURFACE

PRIORITY

This application claims priority to U.S. Provisional Application No. 62/006,415 entitled SLIDERS HAVING AT LEAST TWO REGIONS ON THE TRAILING EDGE SURFACE, filed on Jun. 2, 2014 the disclosure of which is incorporated herein by reference thereto.

SUMMARY

Disclosed herein is a slider that includes a leading edge surface; a trailing edge surface; and an air bearing surface (ABS) positioned between the leading edge surface and the trailing edge surface, wherein the trailing edge surface includes a read-write element, at least one low surface energy region and at least one high surface energy region.

Also disclosed is a slider that includes a leading edge surface; a trailing edge surface; and an air bearing surface (ABS) positioned between the leading edge surface and the trailing edge surface, wherein the trailing edge surface includes a read-write element, and a plurality of micropillars.

Further disclosed is a slider that includes a leading edge surface; a trailing edge surface; and an air bearing surface (ABS) positioned between the leading edge surface and the trailing edge surface, wherein the trailing edge surface includes a read-write element, at least one low surface energy region coating and at least one high surface energy region coating.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure may be more completely understood in consideration of the following detailed description of various embodiments of the disclosure in connection with the accompanying drawings, in which:

FIGS. 8A, 8B, 8C and 8D are partial perspective views (FIGS. 8A, 8B and 8C) of various illustrative embodiments of sliders

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Systems for magnetic memory storage often include a device that is designed and configured to ride on an air bearing over a magnetic data storage disk. The magnetic data storage disk often includes a layer of lubricant/contamination in order to maintain and control the interactions of the magnetic data storage disk and the device (often referred to as slider) traveling on it on the air bearing. The lubricant, contaminants, or combinations thereof (referred to herein collectively as "lube/contaminant") can collect on the trailing edge or the trailing edge surface of the slider. If enough collects, the lube/contaminant can form droplets of lube/contaminant. These droplets, as they grow in size can grow so large that they drop off of the slider onto the disk. This can in turn, result in an excitation of the slider that might cause weak writes or read-write errors. Methods of controlling or eliminating this phenomenon are therefore desired.

Figure 1A:
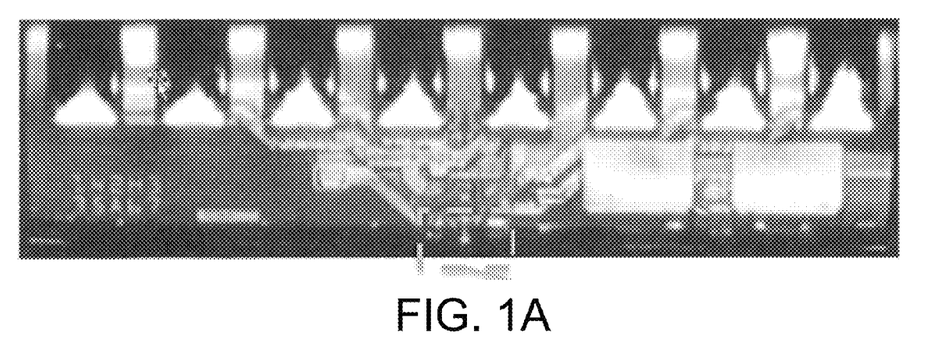
FIGS. 1A, 1B, and 1C are images of the trailing edge of a slider after contamination testing (FIG. 1A), a 500× magnification from the air bearing surface (ABS) view of the slider (FIG. 1B), and a 500× magnification from the trailing edge (FIG. 1C).
Figure 1B:
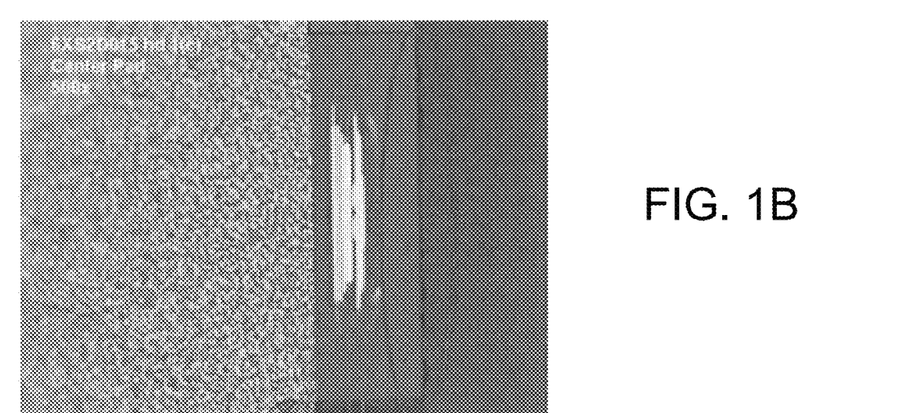
Figure 1C:
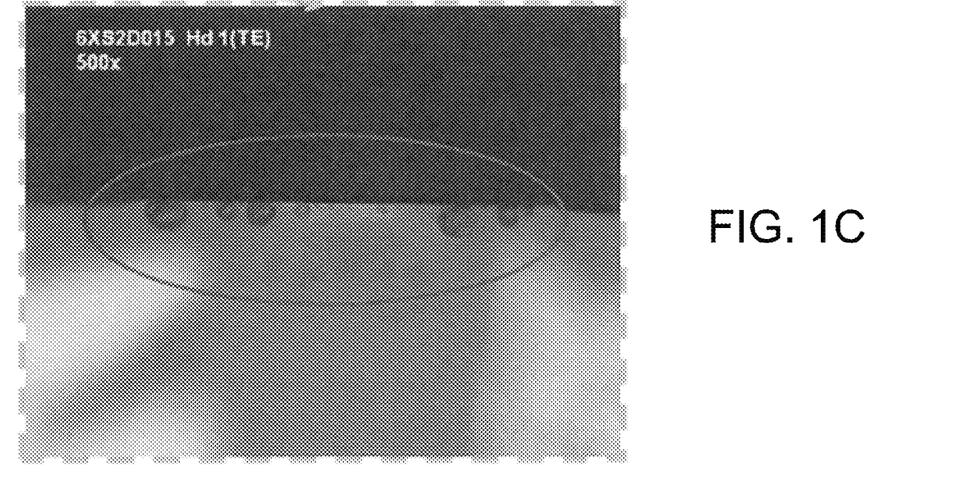

Lube/contaminant droplets on a slider are shown in FIGS. 1A, 1B, and 1C, which show the trailing edge of a hard disk drive (HDD) slider after contamination stress testing. FIG. 1A shows the trailing edge (TE) of a slider, FIG. 1B shows a 500× magnification from the air bearing surface (ABS) view of the slider, and FIG. 1C shows a 500× magnification from the trailing edge. The droplets of lube/contaminant in FIG. 1C are quite easy to see on the ABS.

One method of controlling the droplets is to preferentially direct them to an area of the slider where if (or when) they fall off, they will not have such a detrimental effect. Disclosed herein are various configurations that affect movement of the droplets to more desirable areas of the slider.

Figure 2:
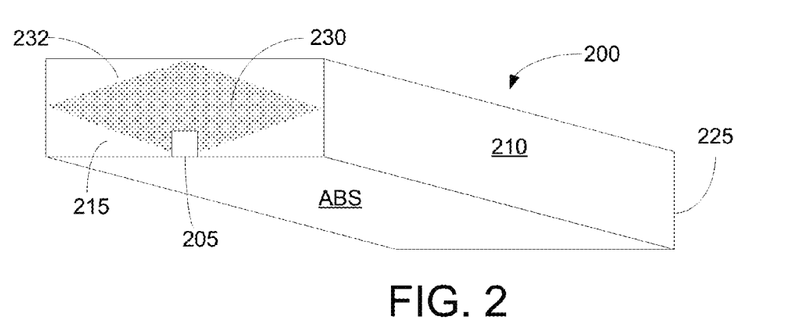
FIG. 2 is a perspective view of an illustrative disclosed slider.

An example of a disclosed exemplary device can be seen in FIG. 2. The slider 200 in FIG. 2 includes a slider body 210 that has a trailing edge surface 215 and an opposing leading edge surface 225. An air bearing surface (ABS) is located on the surface between the trailing edge surface 215 and the leading edge surface 225. When in operation with a magnetic disk, for example, the ABS of the slider 200 is facing the disk. A read/write head 205 is located on or disposed in the trailing edge surface 215 of the slider body 210.

The trailing edge surface 215 of the slider 200 has at least one region of low surface energy 230 and at least one region of high surface energy 232. The configuration, size, and location of the low surface energy region 230 and the high surface energy region 232 need not be as presented in FIG. 2 and both can have virtually any configurations that afford control of lubrication/contamination droplets on the trailing edge surface 215. High and low surface energies can be used as relative terms that describe the relationship of the surface energies of the low and high surface energy regions.

Generally, low surface energy coating regions and high surface energy coating regions are configured and arranged to drive lubricant/contaminant droplets on the trailing edge surface away from the region containing the read/write head 205. This can be accomplished by moving the droplets away from the ABS, moving the droplets away from the center of the trailing edge surface 215 and towards the sides, or a combination thereof. Embodiments described herein can be described as including patterns that utilize discrete surface energy micro regions to create a macro scale surface energy gradient.

Figure 3:
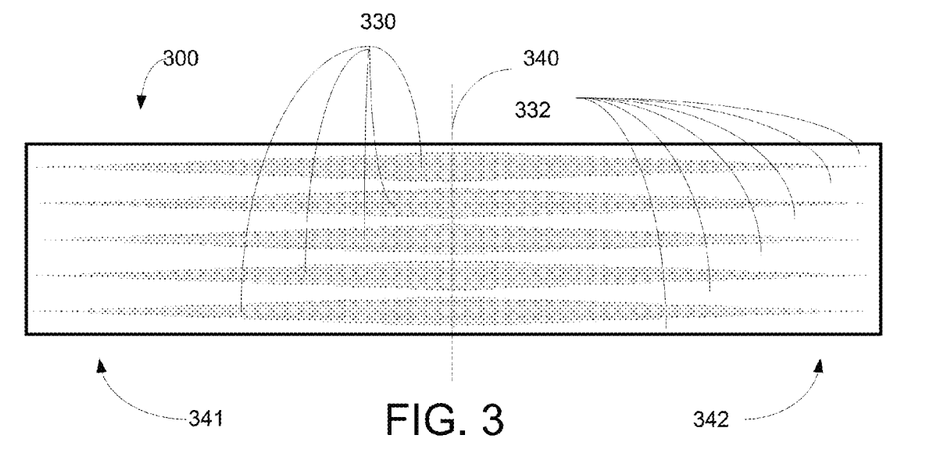
FIG. 3 is a cross section of the trailing edge surface of an illustrative disclosed slider.

FIG. 3 illustrates another embodiment of a slider 300. For the sake of convenience, only the trailing edge surface of the slider 300 is depicted in FIG. 3. One of skill in the art, having read the specification, will understand that the trailing edge surface of the slider is opposite a leading edge surface, two of which are spanned by the ABS. Also not depicted in FIG. 3 is the read/write head. The slider 300 shown in FIG. 3 includes low surface energy coating region 330 and high surface energy coating region 332. The shape and configuration of low surface energy coating region 330 and high surface energy coating region 332 are chosen such that a surface energy gradient from the central region 340 to the outer regions 341 and 342 of the trailing edge surface is formed. The configuration of low surface energy coating region 330 and high surface energy coating region 332 depicted in FIG. 3 can include a single continuous region of the low surface energy coating that makes up low surface energy coating region 330 and a single continuous region of the high surface energy coating that makes up high surface energy coating region 332 or it may include a number of discrete regions which do not form a continuous region.

This surface energy gradient causes any droplets of lubricant/contamination on the trailing edge surface to preferentially flow from the central region 340 to the outer regions 341 and 342. This can be advantageous because if or when the lubricant/contaminant droplets fall from the slider 300 onto the magnetic media they will fall at a region removed from the read/write head, which is generally located at the central region 340 of the slider 300. The configuration of the low surface energy coating region 330 and the high surface energy coating region 332 would in effect cause a lubricant/contaminant droplet that enters the trailing edge surface to see a higher surface energy region in the vertical wall region and therefore be wicked inward. Once there, the droplet would then experience a gradient of increasing surface energy and be transported to the two outer regions 341 and 342 of the trailing edge surface and drop off from there. As mentioned above this would cause the lubricant/contaminant droplets to both be dropped off at an advantageous location and reduce accumulations of lubricant/contamination on the trailing edge surface. Accumulating lubricant/contamination on the trailing edge surface can cause the formation of larger droplets which can lead to more catastrophic failures.

Figure 4:
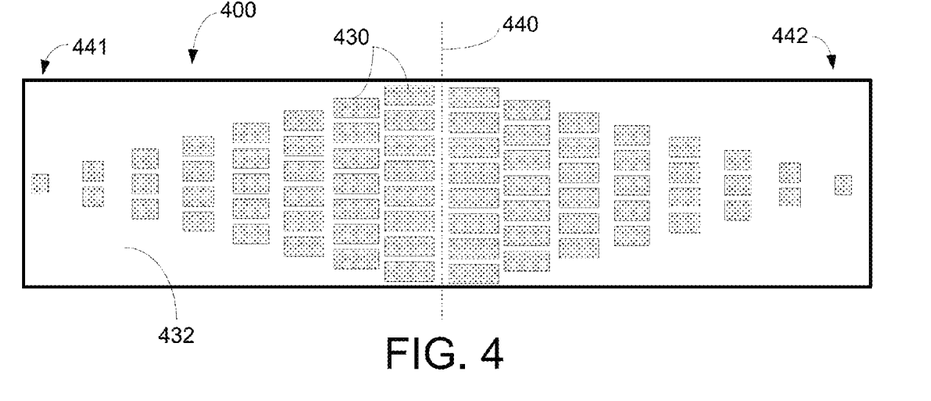
FIG. 4 is a cross section of the trailing edge surface of an illustrative disclosed slider.

FIG. 4 illustrates another embodiment of a slider 400. For the sake of convenience, only the trailing edge surface of the slider 400 is depicted in FIG. 4. One of skill in the art, having read the specification, will understand that the trailing edge surface of the slider is opposite a leading edge surface, two of which are spanned by the ABS. Also not depicted in FIG. 4 is the read/write head. The slider 400 shown in FIG. 4 includes low surface energy coating regions 430 and high surface energy coating region 432. The shape and configuration of low surface energy coating regions 430 and high surface energy coating region 432 are chosen such that a surface energy gradient from the central region 440 to the outer regions 441 and 442 of the trailing edge surface is formed.

In the embodiment depicted in FIG. 4, only two of the low surface energy coating regions 430 are specifically pointed to by reference numeral 430 for the sake of convenience. It will be understood by one of skill in the art having read the specification that all of the stippled regions in FIG. 4 are similar to the two specifically pointed to and are additional low surface energy coating regions. The high surface energy coating region 432 in FIG. 4 is a continuous region with the low surface energy coating regions dispersed thereon, or stated another way the continuous region of the high surface energy coating region can be said to surround the individual low surface energy coating regions. The illustrated embodiment depicted it in FIG. 4 may be advantageous from a processing standpoint because the shapes of the low surface energy coating regions 430 could be easier to fabricate using commonly utilized masking techniques.

Figure 5:
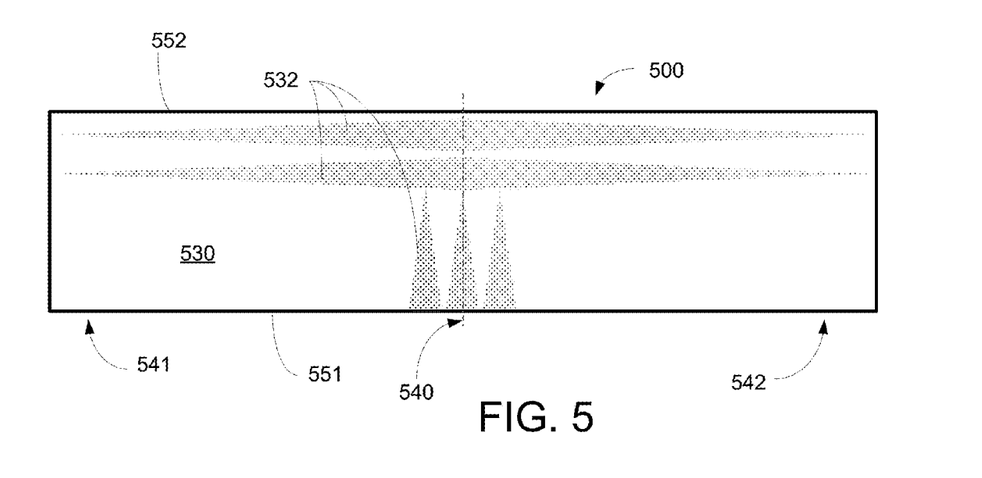
FIG. 5 is a cross section of the trailing edge surface of an illustrative disclosed slider.

FIG. 5 illustrates another embodiment of a slider 500. For the sake of convenience, only the trailing edge surface of the slider 500 is depicted in FIG. 5. One of skill in the art, having read the specification, will understand that the trailing edge surface of the slider is opposite a leading edge surface, the two of which are spanned by the ABS. Also not depicted in FIG. 5 is the read/write head. The slider 500 shown in FIG. 5 includes low surface energy coating regions 530 and high surface energy coating region 532. The slider 500 and FIG. 5 also includes an ABS edge 551 of the trailing edge surface and an opposing backside edge 552. The shape and configuration of low surface energy coating regions 530 and high surface energy coating region 532 are chosen such that two surface energy gradients are formed. The first surface energy gradient is from the central region 540 to the outer regions 541 and 542 of the trailing edge surface is formed. The second surface energy gradient is from the ABS edge 551 to the opposing backside edge 552. The two gradients function to direct flow of lubricant/contaminant droplets vertically up the trailing edge and away from the ABS and laterally away from the center of the trailing edge surface.

Figure 6:
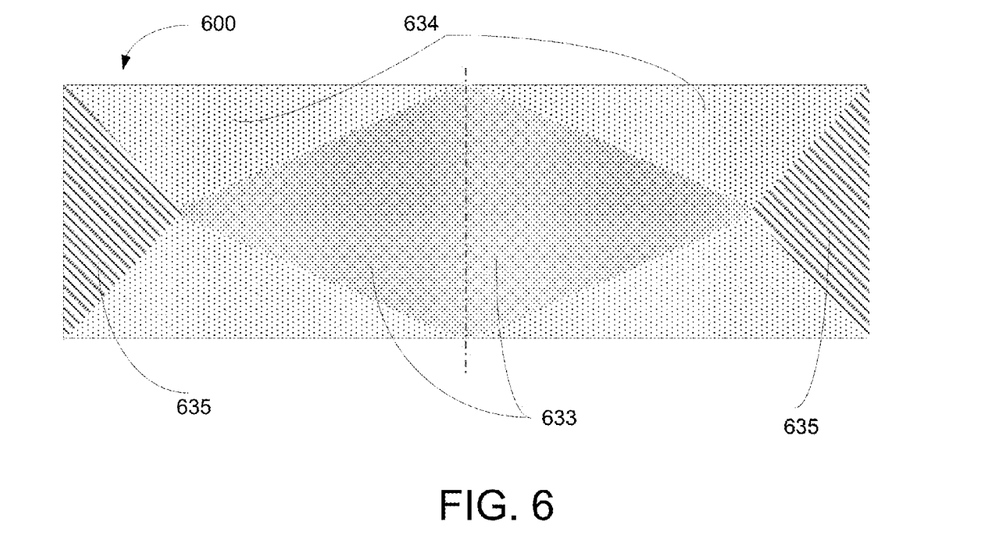
FIG. 6 is a cross section of the trailing edge surface of an illustrative disclosed slider that includes more than two surface energy regions.

Sliders can include regions having more than two different surface energies as well. Such sliders could be referred to as having cascaded, or multi-gradient surface energies. FIG. 6 illustrates another embodiment of a slider 600. For the sake of convenience, only the trailing edge surface of the slider 600 is depicted in FIG. 6. One of skill in the art, having read the specification, will understand that the trailing edge surface of the slider is opposite a leading edge surface, the two of which are spanned by the ABS. Also not depicted in FIG. 6 is the read/write head. The slider 600 shown in FIG. 6 includes a low surface energy region 633, a mid surface energy region 634, and a high energy coating region 635. In embodiments where coatings are utilized to create the various regions, the coating material of the low surface energy region 633 has a surface energy density ($\gamma$) that is less than the coating material of the mid-service energy region 634, and the coating material of the mid-service energy region 634 has a surface energy density ($\gamma$) that is less than the coating material of the high surface energy region 635 ($\gamma$ low surface energy region coating $<\gamma$ mid surface energy region coating $<\gamma$ high surface energy region coating). The configuration of the low surface energy region 633, the mid surface energy region 634 and the high surface energy region 635 can be utilized to form a surface energy gradient at the trailing edge surface that drives a lubricant/contaminant droplet away from the read/write had and towards the corners of the slider along the trailing edge surface.

In some embodiments a multi-gradient system such as that depicted in FIG. 6, can be produced using diamond like carbon (DLC) and modifying it in various ways. DLC coatings also offer an advantage of having robustness under thermal, contact, humidity and contaminant-induced stress conditions. Embodiments such as that depicted in FIG. 6 could be accomplished by utilizing a fluorinated DLC has low surface energy region 633, and unmodified DLC as mid surface energy region 634 and a nitrogenated DLC as high surface energy region 635.

The term "low surface energy" and variations thereof can refer to the tendency of a surface to resist wetting (high contact angle) or adsorption by other unwanted materials or solutions. Low surface energy surfaces are those in which the molecules are functionalized such that adsorbed and/or absorbed contaminants will have weak physical forces and hence allow for partial wetting (or no wetting, e.g., a very high contact angle) of fluids. Values that are representative of "low surface energy" can be as low as 5 dyne/cm, for example and as high as 30 dyne/cm.

The term "high surface energy" can refer to the tendency of a surface to increase or promote wetting (low contact angle) or adsorption by other unwanted materials or solutions. Molecules of high surface energy surfaces can be functionalized such that adsorbed and/or absorbed contaminants will have strong physical attractive forces and promote full wetting (very small contact angle) of most fluids or contaminants. Values that are representative of high surface energy materials are higher than those of low surface energy materials can generally be anything greater than 30 dyne/cm.

In some embodiments materials can be used to form coatings that form low surface energy regions, high service energy regions, mid surface energy regions or combinations thereof. Illustrative materials can include hydrophobic materials, self-assembled monolayers (SAMs), oleophobic materials, and materials that can be modified to provide a desired surface energy.

Illustrative hydrophobic materials can include TEFLON®, fluorine containing polymers, fluorine containing ceramic powders, and otherwise non-hydrophobic materials that are fluorinated. In some embodiments a fluorine containing molecule can be added to various coatings. An illustrative fluorine containing molecule includes Fluorolink D10H for example.

In some embodiments self-assembled monolayers (SAMs) can be utilized in low surface energy regions, high surface energy regions, mid surface energy regions, or some combination thereof. In some embodiments SAMs can be formed from precursor compounds. A precursor compound for forming a self-assembled monolayer can be selected so that the resulting SAM has desired properties. In some embodiments, a low surface energy SAM is desired. An example of a commercially available low surface energy SAM is 1H,1H,2H,2H-perfluorodecyltrichlorosilane (alternately, heptadecafluoro-1,1,2,2-tetrahydro-decyl-1-trichlorosilane) [CAS: 78560-44-8], of course, other low surface energy SAM materials could be used. In general the class of fluorinated organosilane derivatives would work as low energy SAM materials. Other examples of commercially available low surface energy SAMs include: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In other embodiments, a high surface energy SAM is desired. An example of a commercially available high surface energy SAM is (3-aminopropyl)-trimethoxysilane [CAS: 13822-56-5], as well as, other high surface energy SAM materials could be used. The general class of organosilanes with amine, alcohol, or mercapto substituents would provide for a high surface energy SAM, relative to the above. Some commercially available examples include: (3-Mercaptopropyl)trimethoxysilane, methyl 11-[dichloro (methyl)silyl]undecanoate, acetoxyethyltrichlorosilane, vinyltriethoxysilane.

High and low surface energies can also be created using micro structures. For example pillars can be placed in the low surface energy regions. Characteristics of the pillars, including height, width, length, and spacing can be chosen to provide a desired surface energy to form a low surface energy region.

Figure 7A:
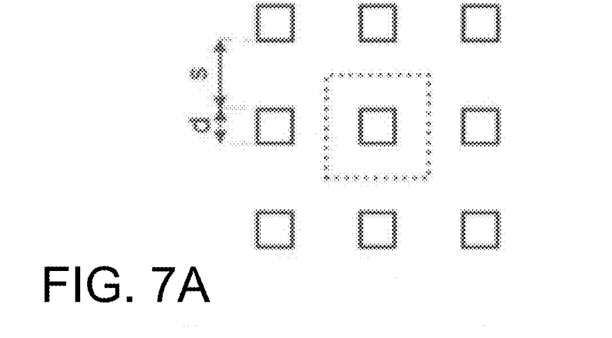
FIGS. 7A, 7B and 7C demonstrate various characteristics of micro-pillars that can be utilized in various embodiments to form surface energy regions.
Figure 7B:
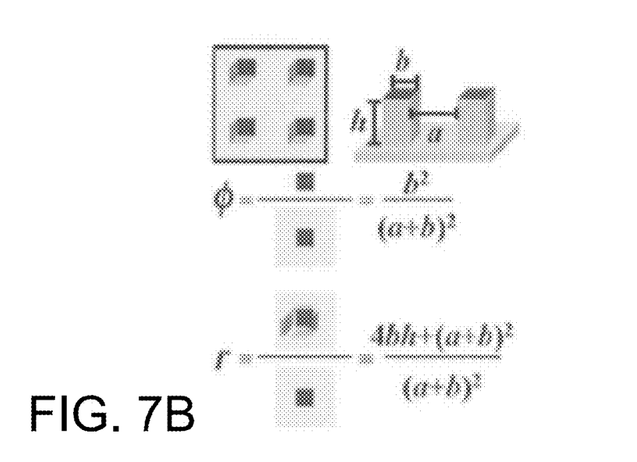
Figure 7C:
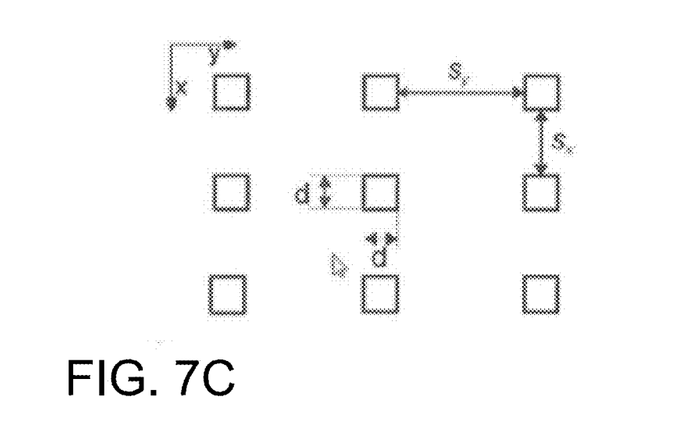

FIGS. 7A to 7C explain how characteristics of the pillars affect the surface energy of the region. FIG. 7A depicts nine pillars having isotropic quadratic post surfaces, and the spacing, s and the dimension, d of the pillars. FIG. 7B shows two pillars on a surface and the height, h and width, b (for these equations it is assumed that the pillars have equal dimensions in the width and length dimension) of each pillar. a is the distance between two pillars. The equations for the fraction of pillar top area ($\Phi$) and the total surface area as a ratio against horizontal surface area (r) are shown in FIG. 7B. The fraction of pillar top area ($\Phi$) determines the apparent contact angle of a surface containing so described pillars and the total surface area as a ratio against horizontal surface area (r) determines the relative stability of the droplet. As seen from these equations, the characteristics of the pillars can be chosen to obtain services having different surface energies. FIG. 7C shows an anisotropic quadratic post surface for the sake of comparison where the distance in one dimension is different than the distance in the other dimension.

Figure 8A:
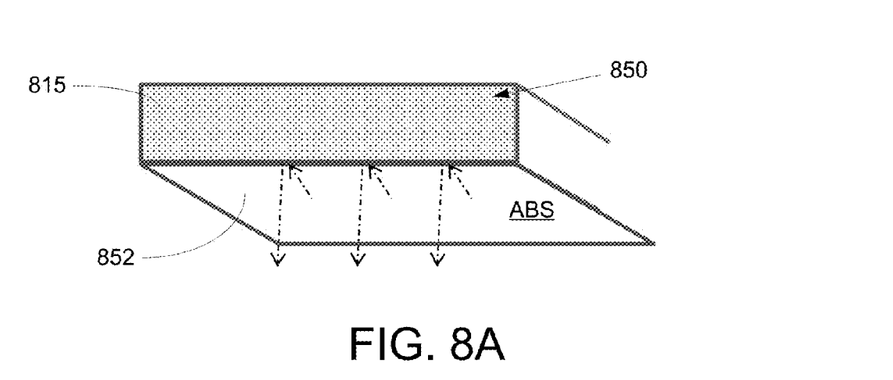

FIG. 8A illustrates another embodiment containing a high surface energy region and a low surface energy region. In the embodiment depicted in FIG. 8A, the low surface energy region 850 is positioned at least on some portion of the entire trailing edge surface 815 of the slider. The high surface energy region 852 is positioned on the ABS of the slider. Such an embodiment could be considered a relatively simple, having a high surface energy region or coating on the ABS and a low surface energy region or coating on the trailing edge surface. Such an embodiment would allow droplets that, based on other factors, travel across the ABS to the trailing edge to fall off immediately at the edge without getting to the trailing edge surface. Because of the low surface energy trailing edge the droplets are less likely to coalesce and do not gain in appreciable size when they fall off the slider trailing edge. This is desired as smaller droplets falling off the slider are much less catastrophic than are larger droplets.

Figure 8B:
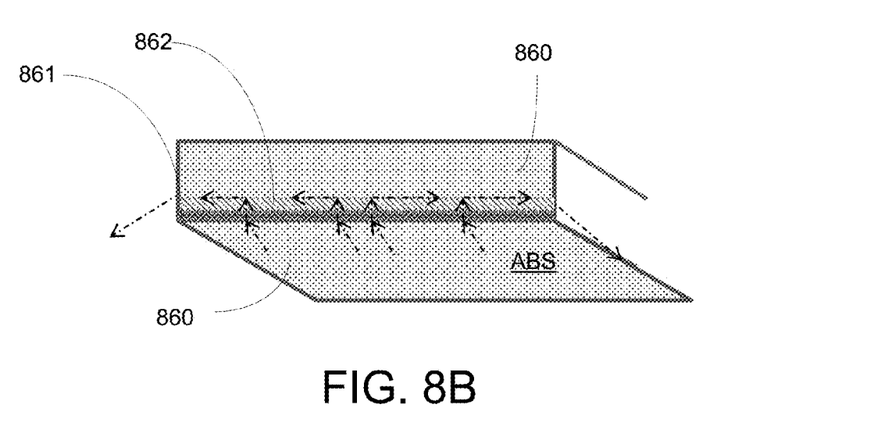

FIG. 8B illustrates another embodiment containing more than two different surface energy regions. The embodiment depicted in FIG. 8B includes low surface energy regions 860, intermediate high surface energy region 861 and a gradient surface energy region 862. The intermediate high surface energy region 861 positioned at the edge transition region can function to transport a lubricant/contamination droplet upward, thereby introducing it to the gradient surface energy region 862 above it. Such an embodiment takes advantage of flow of the lubricant/contamination droplets across the ABS to the trailing edge by then forcing them away from the center of the trailing edge. Embodiment depicted in FIG. 8B can be described as providing a channel (formed from the intermediate high surface energy region 861 and the gradient surface energy region 862) to transport lubricant/contamination droplets out toward the edges of the trailing edge surface.

Figure 8C:
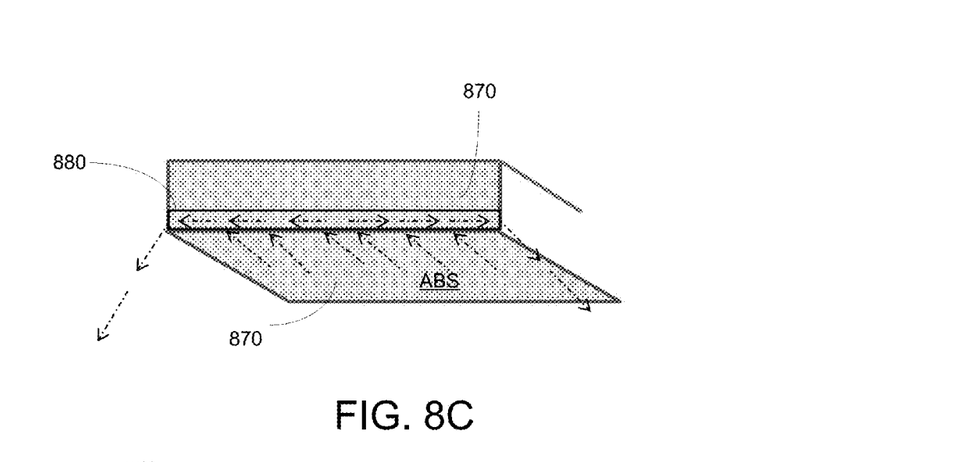
Figure 8D:
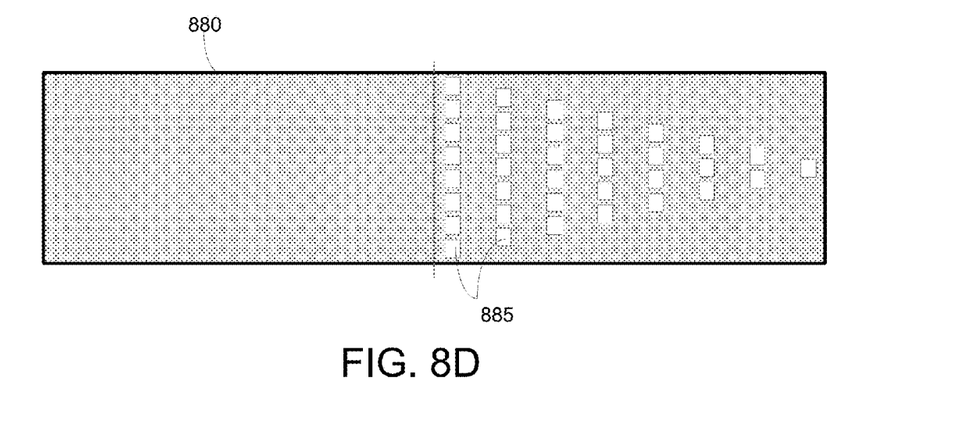
FIG. 8D is a cross section of a portion of the trailing edge surface of the slider of FIG. 8C.

FIGS. 8C and 8D illustrate another embodiment. FIG. 8C shows a slider having low surface energy regions 870 on the ABS and the trailing edge surface. The trailing edge surface in such an embodiment also includes a progressive increase region 880. FIG. 8D shows the progressive increase region 880 more specifically. An illustrative progressive increase region 880 although considered part of the low surface energy region 870 on the trailing edge surface can itself include high surface energy regions. The high surface energy regions 885 within the progressive increase region 880 can be configured to direct flow of lubricant/contamination droplets from the center of the trailing edge surface towards the outer edges. This can be accomplished, for example by having more high energy surface regions 885 at the center of the progressive increase region 880 less high energy surface regions 885 at the edges of the progressive increase region 880. As shown by the dashed arrows in FIG. 8C the high energy surface regions function to shuttle the lubricant/contamination droplets towards the outside.

Disclosed devices can also include structural features, as opposed to coated regions, that can afford transport of contaminants and lubricants to the outer edges of the trailing edge surface. Illustrative structural features can include those described in commonly owned U.S. patent application Ser. No. 14/139,438 entitled SLIDER INCLUDING ONE OR MORE FLUID PATHWAYS, AND RELATED APPARATUSES AND METHODS filed on Dec. 23, 2013, the disclosure of which is incorporated herein by reference thereto in its entirety to the extent it does not conflict, can also be utilized in disclosed devices and sliders.

Figure 9A:
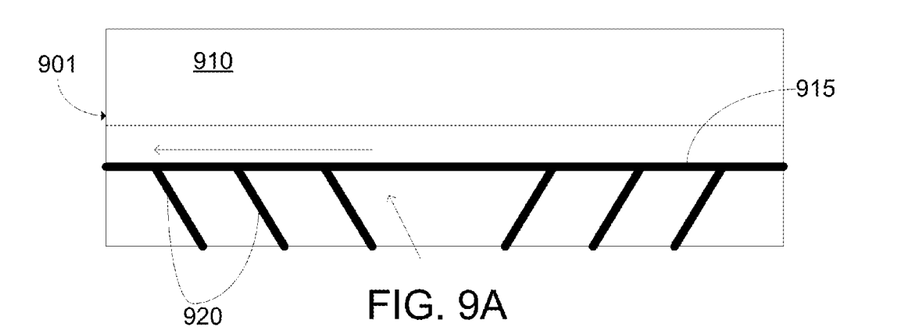
FIGS. 9A to 9C illustrate additional possible constructions of structural features on trailing edge surfaces of disclosed sliders.
Figure 9B:
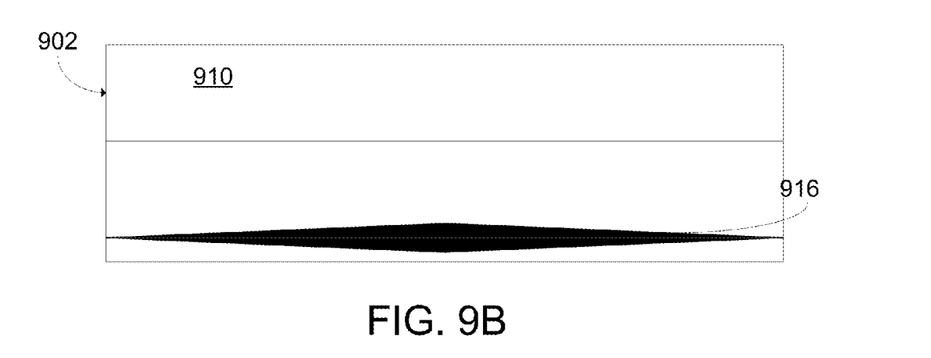
Figure 9C:
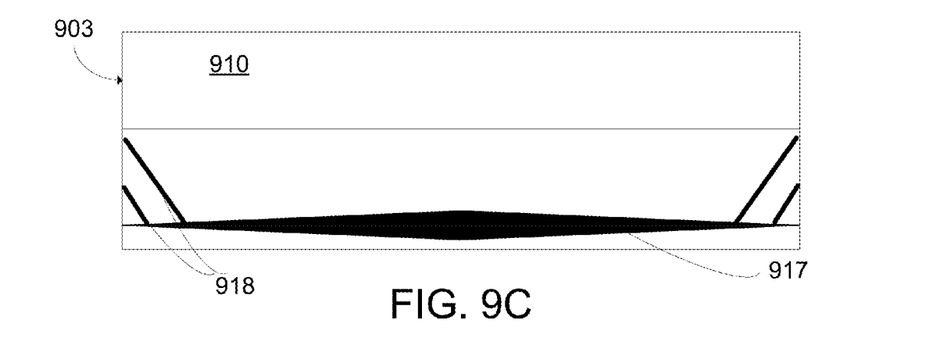

FIGS. 9A to 9C illustrate additional possible constructions of structural features on trailing edge surfaces of disclosed sliders. For example, FIG. 9A illustrates a trailing edge surface 901 which includes a bond pad region 910, a main channel 915 and collection channels 920. In such an embodiment, the main channel 915 and the collection channels 920 are configured to collect lubricant/contamination from the air bearing surface via the collection channels 920 and then direct the flow of those lubricant/contamination droplets from the center of the trailing edge surface towards the outer edges. This flow is illustrated by the arrows shown in the figure. In some embodiments, structures at least similar to the collection channels 920 could also be included on the ABS.

FIG. 9B shows another illustrative example of a trailing edge surface 902 that includes a bonding pad region 910 and a channel 916. As seen in FIG. 9B, the channel 916 is larger in the middle to collect the lubricant/contamination droplets and direct them to the outside edges.

FIG. 9C shows another example of a trailing edge surface 903 that includes a bond pad region 910 and a main channel 917. This embodiment also includes peripheral channels 918. The peripheral channels are designed to offer additional fluid pathways for the lubricant/contamination droplets to exit from the main channel 917.

In some embodiments, features disclosed in various specific embodiments (e.g., FIGS. 9A to 9C) can be combined for use in a single device. For example, the main channel 915 and collection channels 920 illustrated in FIG. 9A could be combined with the peripheral channels 918 (either with or without the centrally larger main channel 917) of FIG. 9C.

Disclosed features, including for example channels (both main, collection, and peripheral), pillars, and any combinations thereof could be fabricated using masking and photolithography techniques for example. The masking and lithography processes could easily be carried out on the alumina overcoat of the slider trailing edge. Channels and arrays e.g., microchannels and micro-pillar arrays could also be fabricated with a laser raster, for example.

One skilled in the art will appreciate that the articles, devices and methods described herein can be practiced with embodiments other than those disclosed. The disclosed embodiments are presented for purposes of illustration and not limitation. One will also understand that components of the articles, devices and methods depicted and described with regard to the figures and embodiments herein may be interchangeable.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of sliders having at least two regions on the trailing edge surface are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A slider comprising:
a leading edge surface;
a trailing edge surface having a central region and two opposing outer regions; and
an air bearing surface (ABS) positioned between the leading edge surface and the trailing edge surface,
wherein the trailing edge surface comprises a read-write element in the central region, at least one low surface energy region and at least one high surface energy region configured to form a surface energy gradient from the central region to the two opposing outer regions.

2. The slider according to claim 1, wherein the at least one region of low surface energy and the at least one region of high surface energy form a pattern.

3. The slider according to claim 1, wherein the at least one low surface energy region and the at least one high surface energy region comprises coatings of materials.

4. The slider according to claim 3, wherein at least one of the low surface energy region or the high surface energy region comprises self assembled monolayers (SAMs).

5. The slider according to claim 3, wherein the at least one low surface energy region comprises a coating of a hydrophobic material.

6. The slider according to claim 5, wherein the hydrophobic material comprises fluorine.

7. The slider according to claim 3, wherein the at least one low surface energy region comprises a coating of an oleophobic material.

8. The slider according to claim 1, wherein the at least one low surface energy region and the at least one high surface energy region are configured to drive droplets of lubricant/contaminants away from the ABS.

9. The slider according to claim 1, wherein the at least one low surface energy region and the at least one high surface energy region are configured to drive droplets of lubricant/contaminants along the trailing edge surface towards the outer edges thereof.

10. The slider according to claim 1, wherein the at least one low surface energy region and the at least one high surface energy region are configured to drive droplets of lubricant/contaminants away from the ABS and along the trailing edge surface towards the outer edges thereof.

11. The slider according to claim 1, wherein the at least one region of low surface energy is disposed directly adjacent to the ABS.

12. The slider according to claim 1 further comprising at least one region of mid surface energy.

13. The slider according to claim 12, wherein the high surface energy region comprises nitrogenated-diamond like carbon (N-DLC), the mid surface energy region comprises diamond like carbon (DLC), and the low surface energy region comprises fluorinated-diamond like carbon (F-DLC).

14. The slider according to claim 1, wherein the high surface energy regions, low surface energy regions, or combinations thereof form an array of micro-pillars.

15. The slider according to claim 1, wherein the at least one low surface energy region and the least one high surface energy region are configured to cause droplets of lubricant to preferentially flow from the central region to the outer regions of the trailing edge.

16. A slider comprising:
a leading edge surface;
a trailing edge surface having a central region and two opposing outer regions; and
an air bearing surface (ABS) positioned between the leading edge surface and the trailing edge surface,
wherein the trailing edge surface comprises a read-write element in the central region, at least one low surface energy region coating and at least one high surface energy region coating configured to form a surface energy gradient from the central region to the two opposing outer regions.

17. The slider according to claim 16, wherein at least one of the low surface energy region coating or the high surface energy region coating comprises self assembled monolayers (SAMs).

18. The slider according to claim 16, wherein the at least one low surface energy region comprises a coating of a hydrophobic material.

19. The slider according to claim 18, wherein the hydrophobic material comprises fluorine.

20. The slider according to claim 16, wherein the at least one low surface energy region comprises a coating of an oleophobic material.

* * * * *